United States Patent
Ma et al.

(10) Patent No.: US 12,352,570 B2
(45) Date of Patent: Jul. 8, 2025

(54) CABIN ENTRY-AND-EXIT STRUCTURE OF ANALYSIS DEVICE, ANALYSIS DEVICE AND ANALYSIS SYSTEM

(71) Applicants: Beijing BOE Technology Development Co., Ltd., Beijing (CN); BOE Technology Group Co., Ltd., Beijing (CN)

(72) Inventors: Xiangguo Ma, Beijing (CN); Haonan Liu, Beijing (CN); Kai Geng, Beijing (CN); Shinying Lau, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/639,032

(22) PCT Filed: Apr. 29, 2021

(86) PCT No.: PCT/CN2021/090879
§ 371 (c)(1),
(2) Date: Feb. 28, 2022

(87) PCT Pub. No.: WO2022/226869
PCT Pub. Date: Nov. 3, 2022

(65) Prior Publication Data
US 2024/0035802 A1 Feb. 1, 2024

(51) Int. Cl.
*G01B 9/02* (2022.01)
*B01L 3/00* (2006.01)
(Continued)

(52) U.S. Cl.
CPC ......... *G01B 9/02051* (2013.01); *G01N 35/00* (2013.01); *B01L 9/527* (2013.01);
(Continued)

(58) Field of Classification Search
None
See application file for complete search history.

(56) References Cited

U.S. PATENT DOCUMENTS

| 2015/0251184 A1 | 9/2015 | Watanabe et al. |
| 2023/0116464 A1* | 4/2023 | Xu .................... B01L 3/502746 422/504 |

FOREIGN PATENT DOCUMENTS

| CN | 2751304 Y | 1/2006 |
| CN | 2891205 Y | 4/2007 |

(Continued)

OTHER PUBLICATIONS

Machine generated machine translation for CN110951610 (Year: 2020).*

(Continued)

*Primary Examiner* — P. Kathryn Wright
(74) *Attorney, Agent, or Firm* — Nath, Goldberg & Meyer; Joshua B. Goldberg

(57) ABSTRACT

A cabin entry-and-exit structure, an analysis device and an analysis system are provided. The cabin entry-and-exit structure includes a carrier body, a guide support assembly and a door opening-and-closing assembly. The carrier body is configured to bear the loading part; the guide support assembly is disposed on a base board in a cabin body of the analysis device, is configured to support the carrier body, and is movably connected to the carrier body so that the carrier body is movable; the door opening-and-closing assembly is disposed on the base board and located on a side of the carrier body far away from a door, configured to apply a pushing force to the carrier body towards the exit direction when the carrier body is subjected to a pressing force and to lock the carrier body at a cabin closing position when the carrier body is subjected to a pressing force again.

15 Claims, 11 Drawing Sheets

(51) Int. Cl.
  *B01L 9/00* (2006.01)
  *G01N 35/00* (2006.01)
  *G01N 21/01* (2006.01)

(52) U.S. Cl.
  CPC ...... *B01L 2300/0609* (2013.01); *G01N 21/01* (2013.01); *G01N 2021/0112* (2013.01); *G01N 35/00029* (2013.01); *G01N 2035/00039* (2013.01); *G01N 2035/00306* (2013.01)

(56) References Cited

FOREIGN PATENT DOCUMENTS

| | | |
|---|---|---|
| CN | 102943032 A | 2/2013 |
| CN | 202808801 U | 3/2013 |
| CN | 106353320 A | 1/2017 |
| CN | 206020278 U | 3/2017 |
| CN | 106885807 A | 6/2017 |
| CN | 107238716 A | 10/2017 |
| CN | 107904156 A | 4/2018 |
| CN | 108956464 A | 12/2018 |
| CN | 109612996 A | 4/2019 |
| CN | 210005437 U | 1/2020 |
| CN | 110951610 A * | 4/2020 ........... C12Q 1/6806 |
| CN | 210742276 U | 6/2020 |
| CN | 214585494 U * | 11/2021 |
| CN | 111537707 B * | 7/2023 ............. G01N 21/76 |
| WO | WO-2022160278 A1 * | 8/2022 ........ B01L 3/502715 |

OTHER PUBLICATIONS

Machine generated machine translation for CN111537707 (Year: 2023).*
Machine generated machine translation for CN214585494 (Year: 2021).*
Machine generated machine translation for wo2022160278 (Year: 2022).*

* cited by examiner

CABIN ENTRY-AND-EXIT STRUCTURE OF ANALYSIS DEVICE, ANALYSIS DEVICE AND ANALYSIS SYSTEM This is a National Phase Application filed under 35 U.S.C. 371 as a national stage of PCT/CN2021/090879, filed Apr. 29, 2021, the content of which is hereby incorporated by reference in its entirety.

TECHNICAL FIELD

Embodiments of the present disclosure relate to a cabin entry-and-exit structure of an analysis device, an analysis device and an analysis system.

BACKGROUND

Biochip is a chip technology that displaces the processes of processing and analyzing biological information to a chip of a biological substrate, which has the characteristics of micro-dosing, miniaturization, automation and high-throughput. According to the biomolecules that are solid-phased on the chip surface, the biochips can be classified as gene chips, protein chips, microfluidic chips, organ chips and the like, and have been applied to a variety of aspects such as medical diagnosis, accurate medication and hygienic safety.

SUMMARY

At least one embodiment of the present disclosure provides a cabin entry-and-exit structure of an analysis device. The cabin entry-and-exit structure is configured to transport a loading part, which is adapted to bear a detection chip, of the analysis device, so as to realize entry or exit of the loading part into or out of a cabin, and the cabin entry-and-exit structure includes a carrier body, a guide support assembly and a door opening-and-closing assembly, wherein the carrier body is configured to bear the loading part; the guide support assembly is disposed on a base board in a cabin body of the analysis device and is configured to bear the carrier body, and the guide support assembly is movably connected to the carrier body so that the carrier body is movable along an entry direction into the cabin or an exit direction out of the cabin; and; the door opening-and-closing assembly is disposed on the base board and located on a side of the carrier body far away from a cabin door, and the door opening-and-closing assembly is configured to apply a pushing force to the carrier body towards the exit direction when the carrier body is subjected to a pressing force, so that the carrier body moves to a cabin opening position, and to lock the carrier body at a cabin closing position when the carrier body is subjected to a pressing force again.

Optionally, the guide support assembly includes a support component, a guide rail and a slider, and the support component is disposed on the base board and configured to support the carrier body; one of the guide rail and the slider is disposed on a surface of the support component facing away from the base board, and the other of the guide rail and the slider is disposed on a surface of the carrier body facing towards the base board; and the guide rail and the slider are slidably connected along the entry direction or the exit direction.

Optionally, the support component includes a first support subcomponent, a second support subcomponent and at least one roller, the first support subcomponent is fixedly connected to the base board, and one of the guide rail and the slider is disposed on a surface of the first support subcomponent facing away from the base board; the second support subcomponent is fixedly connected to a surface of the carrier body facing towards the base board and is close to one end of the carrier body far away from the cabin door; and the roller is disposed on the second support subcomponent and is in rolling contact with the base board.

Optionally, the door opening-and-closing assembly includes a fixing stand, a limiting structure disposed on the fixing stand, and an elastic member connected to the limiting structure, the fixing stand is fixed on the base board and located on a side of the carrier body far away from the cabin door; the limiting structure is connected to the elastic member and is detachably connected to the carrier body, and the limiting structure is configured to unlock the carrier body when the carrier body at the cabin closing position moves to a trigger position along the entry direction under the pressing force, and to apply a pushing force to the carrier body towards the exit direction under an elastic force of the elastic member, so that the carrier body moves to the cabin opening position; and the limiting structure locks the carrier body at the cabin closing position when the carrier body at the cabin opening position moves to the trigger position along the entry direction under the pressing force.

Optionally, the limiting structure includes a housing, a limiting member and a locking member, the housing has an opening at a side opposite to the carrier body, and a guide limiting part is disposed at an inner surface of the housing; the elastic member is positioned in an internal space of the housing, a fixed end of the elastic member is fixedly connected to the housing, and a telescopic end of the elastic member is fixedly connected to the locking member; the limiting member is rotatably connected to the telescopic end of the elastic member, and the limiting member is configured such that when the telescopic end of the elastic member is stretched and retracted in a direction close to or far away from the opening, the elastic member is capable of driving the limiting member to slide along the guide limiting part, so that the limiting member sequentially passes through a first position, a second position and a third position from an initial position, when the limiting member is at the initial position, the carrier body is positioned at the cabin opening position; when the limiting member is at the first position or the third position, the carrier body is positioned at the trigger position; when the limiting member is at the second position, the limiting member and the guide limiting part are relatively fixed, and the carrier body is positioned at the cabin closing position; and the locking member is capable of moving into and out of the internal space of the housing through the opening, and the locking member is detachably connected to the carrier body and is configured to remain connected to the carrier body in a process where the carrier body moves from the cabin opening position to the cabin closing position, so that the carrier body is locked at the cabin closing position; and the locking member is separated from the carrier body in a process where the carrier body moves from the cabin closing position to the cabin opening position, so that the carrier body independently moves to the cabin opening position.

Optionally, the locking member includes one of a magnet and an iron block, and the other of the magnet and the iron block is disposed on a surface of the carrier body opposite to the locking member.

Optionally, a first catch is disposed on a surface of the carrier body opposite to the locking member, the locking member includes a second catch, which is in an original state of being separated from the first catch when located outside the internal space of the housing; the second catch generates elastic deformation under an extrusion action of the housing in a process of moving into the internal space of the housing through the opening, so as to be engaged with the first catch.

Optionally, a receiving groove is disposed on an upper surface of the carrier body to receive the loading part; and a plurality of mounting holes are disposed on a bottom surface of the receiving groove to be detachably connected to the loading part by a fastener.

Optionally, a surface of the carrier body facing away from an interior of the cabin body is flush with an outer surface of the cabin body when the carrier body is located at the cabin closing position.

As another technical scheme, an embodiment of the present disclosure further provides an analysis device, including: a loading part, an access part and a signal detecting part, wherein the loading part is configured to bear a detection chip; the access part includes the cabin entry-and-exit structure according to any one of embodiments of the disclosure, and is configured to transport the loading part, so as to realize entry or exit of the loading part into or out of a cabin; and the signal detecting part includes an optical sensor configured to receive light from the detection chip and perform detection based on the light when the access part is located at the cabin closing position.

Optionally, the loading part includes a loading plate, and a chip groove is disposed on a first plate surface of the loading plate to receive the detection chip; the chip groove has a shape and size in match with a shape and size of the detection chip; and a pick-and-place groove in communication with the chip groove is further disposed on the first plate surface.

Optionally, two pick-and-place grooves are symmetrically disposed at opposite sides of the chip groove.

Optionally, an optical detection centering region is disposed on a bottom surface of the chip groove, the optical detection centering region being directly opposite to the signal detecting part and located at a center of an image.

Optionally, the optical sensor is an image sensor configured to capture an optical image of the detection chip for analysis.

Optionally, the image sensor is a charge coupled device.

Optionally, the signal detecting part further includes: a light source configured to provide, in use, light to illuminate the detection chip; a light transmission part configured to transmit, in use, the light provided from the light source to the detection chip and to transmit light emitted by the detection chip to the optical sensor; and a bracket configured to fix and support the light source and the light transmission part, and a focal length adjusting structure is further disposed on the bracket and configured to adjust a distance between the light transmission part and the detection chip, so that the detection chip is located at a focus of the light transmission part; and the focal length adjusting structure has a focal length adjusting knob and a knob extension connected to the focal length adjusting knob, the knob extension extending to a side close to the optical transmission portion to facilitate manual adjustment.

Optionally, the analysis device further includes a controller configured to be in signal connection with the optical sensor to analyze the light from the detection chip.

Optionally, the analysis device further includes at least one of groups consisting of a display screen, a touch sensor, a power interface, and a data transmission interface.

Optionally, the analysis device is applied to a microfluidic chip.

As another technical scheme, an embodiment of the present disclosure further provides an analysis system, including: the analysis device according to any one of embodiments of the present disclosure; and the detection chip.

BRIEF DESCRIPTION OF DRAWINGS

To illustrate the technical schemes of the embodiments of the present disclosure more clearly, the accompanying drawings of the embodiments will be briefly introduced below, and it is apparent that the drawings in the following description merely involve some embodiments of the present disclosure and are not intended to limit the present disclosure.

DETAIL DESCRIPTION OF EMBODIMENTS

Figure 1A:
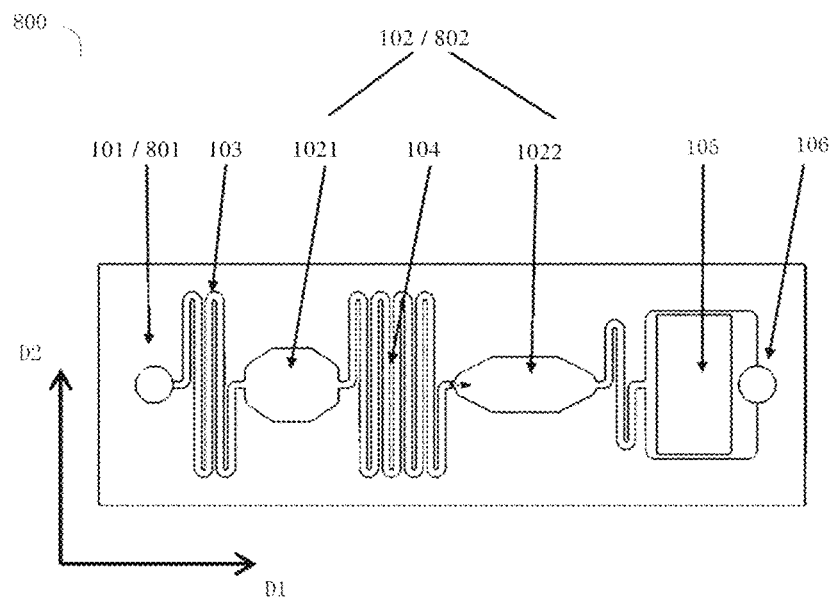
FIG. 1A is a structural diagram of a detection chip according to at least one embodiment of the present disclosure.

In order to illustrate the objects, technical schemes and advantages of the embodiments of the present disclosure more clearly, the technical schemes of the embodiments of the present disclosure will be described clearly and completely below with reference to the drawings of the embodiments of the present disclosure. It is to be understood that the described embodiments are not all embodiments of the present disclosure but only a few embodiments of the present disclosure. All other embodiments, which can be derived by a person skilled in the art from the described embodiments of the disclosure without inventive step, are within the scope of protection of the disclosure.

Unless defined otherwise, technical or scientific terms used herein shall have the ordinary meaning as understood by those of ordinary skill in the art to which this disclosure belongs. The use of "first," "second" and the like in this disclosure is not intended to indicate any order, quantity, or importance, but rather to distinguish one component from other components. The word "comprising" or "comprises", "including" or "includes" and the like means that the element or item preceding the word comprises the element or item listed after the word and its equivalent, but does not exclude other elements or items. The terms "connected" or "coupled" and the like are not restricted to physical or mechanical connections, but can include electrical connections, whether direct or indirect. The terms "upper", "lower", "left", "right", and the like are used only to indicate relative positional relationships, and when the absolute position of the object being described is changed, the relative positional relationships can also be changed accordingly.

For sake of a clear and concise description of the embodiments of the present disclosure, details description of commonly known functions and commonly known components are omitted from the present disclosure.

Some existing biochip reader products generally require multiple sets of auxiliary equipments to obtain an analysis result, which results in non-portability, long detection time, low automation degree, high detection cost, multiple operation steps and risk of reagent contamination.

At least one embodiment of the present disclosure provides a cabin entry-and-exit structure of an analysis device, an analysis device and an analysis system. The analysis device of this embodiment combines and integrates a loading part, an access part and a signal detecting part, and realizes detection of a detection chip in a single equipment, which reduces the number of required auxiliary equipments, simplifies the operation steps, shortens the detection time, improves the automation degree, lowers the detection cost, and reduces the risk of reagent contamination. In addition, by using the cabin entry-and-exit structure to transport a loading part that bears a detection chip, entry or exit of the loading part into or out of a cabin is realized, which not only simplifies the installation process of the loading part and realizes automatic entry and exit of the loading part into and out of the cabin, but also improves the operation convenience and working efficiency.

Biochip is a chip technology that displaces the processes of processing and analyzing biological information to a chip of a biological substrate. According to the biomolecules that are solid phased on the chip surface, the biochips can be classified as gene chips, protein chips, microfluidic chips, organ chips and the like. At least one embodiment of the present disclosure provides an analysis device and an analysis system. A signal detecting part is adopted to receive light from the detection chip, perform detection based on the light, and analyze the light from the detection chip. The detection speed is fast and the operation is simple. Such detection has great application prospects in scenarios such as ambulances, emergency centers, and disaster sites.

At least one embodiment of the present disclosure provides an analysis device and an analysis system, which is applied to biochips such as gene chips, protein chips, microfluidic chips, and organ chips. Taking microfluidic chip as an example, FIG. 1A is a structural diagram of a detection chip according to at least one embodiment of the present disclosure. As shown in FIG. 1A, the microfluidic chip includes a substrate 800, including: a sample inlet 801, and a reaction zone 802 located downstream of the sample inlet 801. The reaction zone 802 includes at least one groove, and an orthographic projection of each groove on the substrate 800 is an axisymmetric pattern. A width of the axisymmetric pattern in a first direction D1 is not less than a width of the axisymmetric pattern in a second direction D2, and the first direction D1 is perpendicular to the second direction D2.

It should be noted that, in the present disclosure, the first direction D1 refers to a direction in which liquid moves when passing through the reaction zone during use of the microfluidic chip, and the second direction D2 refers to a direction perpendicular to the direction in which the liquid moves in the reaction zone. In some embodiments, as shown in FIG. 1A, the reaction zone includes a first groove 1021 and a second groove 1022, an orthographic projection of the first groove 1021 on the substrate 800 is a first axisymmetric pattern having a first axis of symmetry (along the first direction D1 in FIG. 1A), and an orthographic projection of the second groove 1022 on the substrate is a second axisymmetric pattern having a second axis of symmetry (also along the first direction D1 in FIG. 1A). It should be noted that the first axis of symmetry and the second axis of symmetry in the same direction are merely exemplary, and in some embodiments, the first axis of symmetry and the second axis of symmetry have an included angle therebetween. More specifically, for embodiments where the reaction zone includes more grooves, the included angles between the axes of symmetry of the respective axisymmetric patterns can be the same or can be different.

By designing the reaction zone into an elongated shape, the liquid can have a smaller advancing surface, which is advantageous for reducing bubbles, and thus the sample can pass through the reaction zone more uniformly, thereby improving the detection effect.

In some embodiments, the reaction zone includes at least two grooves, and the orthographic projections of the at least two grooves on the substrate 800 can have different shapes. For example, referring to a first groove 1021 and a second groove 1022 schematically illustrated in FIG. 1A, the shape of the first groove 1021 and the shape of the second groove 1022 can be different. An orthographic projection of the first groove 1021 on the substrate is a first axisymmetrical pattern, and an orthographic projection of the second groove 1022 on the substrate is a second axisymmetrical pattern. In some embodiments, the first axisymmetric pattern has a width in the first direction D1 smaller than a width of the second axisymmetric pattern in the first direction D1. In some embodiments, the first axisymmetric pattern has a width in the second direction D2 greater than a width of the second axisymmetric pattern in the second direction D2. In some embodiments of the present disclosure, the reaction zone includes at least two grooves, and the orthographic projection of the at least two grooves on the substrate can have the same shape.

In some embodiments of the present disclosure, the axisymmetric pattern includes a polygon, a circle, a spindle, etc., and the shape and size of the reaction zone is appropriately designed by those skilled in the art according to actual needs, which are not particularly limited in the present disclosure. FIG. 1A illustrates, by way of example, a hexagonal reaction zone, which can effectively reduce bubbles generated during the flow of the liquid, thereby making the flow of the reactant more uniform.

The substrate 800 further includes a mixing zone downstream of the sample inlet 101, such as a first mixing zone 103 upstream of the first groove 1021 and a second mixing zone 104 upstream of the second groove 1022. As shown in FIG. 1A, the mixing zone includes a serpentine flow passage. The serpentine flow passage brings forth a more compact flow passage, and provides a longer flow passage in a limited chip area, such that the reactants are mixed more thoroughly and uniformly.

In some embodiments of the present disclosure, as shown in FIG. 1A, a length of the flow passage of the second mixing zone 104 is greater than a length of the flow passage of the first mixing zone 103, such that the sample in the first groove 1021 of the reaction zone 102 can be reacted more sufficiently before entering the second groove 1022 of the reaction zone 102 for subsequent reaction.

In some embodiments of the present disclosure, as shown in FIG. 1A, the substrate 800 further includes a waste liquid zone 105 and a sample outlet 106, the waste liquid zone 105 being located downstream of the reaction zone 102 and upstream of the sample outlet 106. After the reaction in the microfluidic chip is finished, a buffer solution is pumped in from the sample inlet to clean antibody which does not react. The waste liquid zone is adapted to collect and clean the waste liquid in the reaction zone to avoid any influence on the detection result. For example, the waste liquid zone has a rectangular shape as shown in FIG. 1A.

It should be understood that, the embodiment of the present disclosure is described by taking the reaction zone of the microfluidic chip including two grooves as an example, and a person skilled in the art can design the number of the grooves of the reaction zone and the number of the openings of the second substrate according to actual needs, which are not limited in the present disclosure.

In some embodiments of the disclosure, an orthographic projection of the reaction zone on the substrate can be located within an orthographic projection of the opening on the substrate. For example, an orthographic projection of a first groove of the reaction zone on the substrate is located within an orthographic projection of a first opening on the substrate, and an orthographic projection of a second groove of the reaction zone on the substrate is located within an orthographic projection of a second opening on the substrate, such that the substance to be detected flowing through the reaction zone is in sufficient contact with the substance on a cover plate. In some embodiments, the orthographic projection of the opening on the substrate can be located within the orthographic projection of the reaction zone on the substrate. For example, the orthographic projection of the first opening on the substrate is located within the orthographic projection of the first groove of the reaction zone on the substrate, and the orthographic projection of the second opening on the substrate is located within the orthographic projection of the second groove of the reaction zone on the substrate, such that the substance on the cover plate is in sufficient contact with the substance to be detected flowing through the reaction zone. The shape and size of the reaction zone and the opening can be reasonably designed by those skilled in the art according to actual needs. Optionally, the widths of the orthographic projection of the reaction zone on the substrate and the orthographic projection of the opening on the substrate in the second direction can be equal, and two edges of the orthographic projection of the reaction zone on the substrate perpendicular to the second direction completely coincide with two edges of the orthographic projection of the opening on the substrate perpendicular to the second direction, respectively. Furthermore, optionally, the orthographic projection of the reaction zone on the substrate completely coincides with the orthographic projection of the opening on the substrate.

In some embodiments of the present disclosure, the substrate can employ a polymer material, such as Polymethylmethacrylate (PMMA), polydimethylsiloxane, polycarbonate, polyethylene terephthalate, cycloolefin copolymers, and the like. The polymer material is easy to process, which makes it easier to prepare the flow passage and the respective functional areas of the microfluidic chip.

It is understood that the shape and ratio of the reaction zone in the embodiments of the present disclosure are exemplary, and those skilled in the art can design the length-width ratio of the reaction zone according to the size of an actual chip and its targeted application requirements.

Taking the microfluidic chip for immunofluorescence assay as an example, the substrates can all be made of polymer material, such as PMMA, and the cover plate can be made of glass. In this case, antibody can be grafted on the modified glass and then stored by freeze-drying, and the cover plate can be attached to the second substrate after the first substrate and the second substrate are thermally compression-bonded. In this way, freeze-drying of the antibody and thermocompression bonding of the substrates are performed separately to avoid influence of the thermocompression bonding on antibody grafting and storage.

The reaction flow of the microfluidic chip for immunofluorescence assay is illustrated with reference to FIG. 1. A sample to be detected accesses from the sample inlet 101, enters the first groove 1021 of the reaction zone after passing through the serpentine first mixing zone 103, then the sample to be detected can react with a freeze-dried fluorescent antibody pre-buried on a cover plate (not shown in the figure) corresponding to a first groove 1021 to redissolve the antibody. Then the antigen is combined with the antibody specificity. The antigen in the sample fully reacts with the fluorescent antibody after passing through the serpentine second mixing zone 104. When the antigen-antibody pair reaches the second groove 1022 of the reaction zone, the antigen-antibody pair reacts with a capture antibody grafted on the cover plate (not shown in the figure) corresponding to the second groove 1022 to form a double-antibody sandwich. After the reaction is finished, the buffer solution is pumped in from the sample inlet 101 of the chip to wash the reaction zone to wash the fluorescent antibody that is not captured, and waste liquid flows into the waste liquid zone 106. The chip is placed in an analysis device for optical signal detection to judge the content of the antigen in the sample.

Figure 1B:
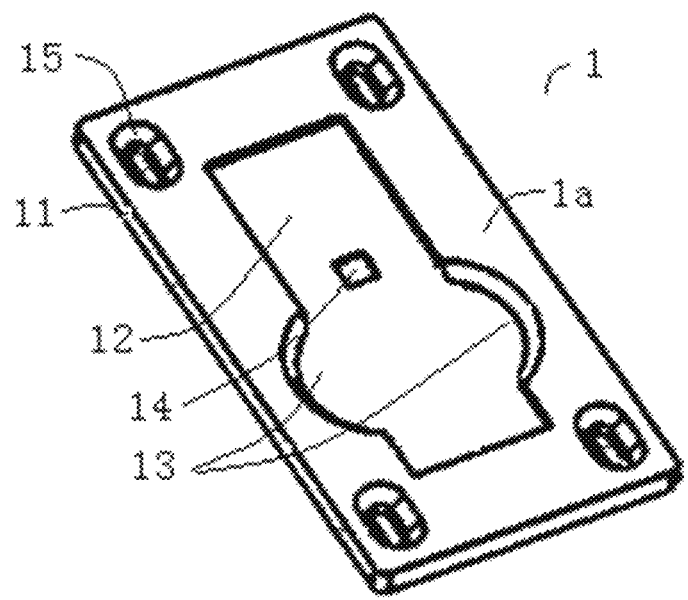
FIG. 1B is a structural diagram of a loading part according to at least one embodiment of the present disclosure.
Figure 2:
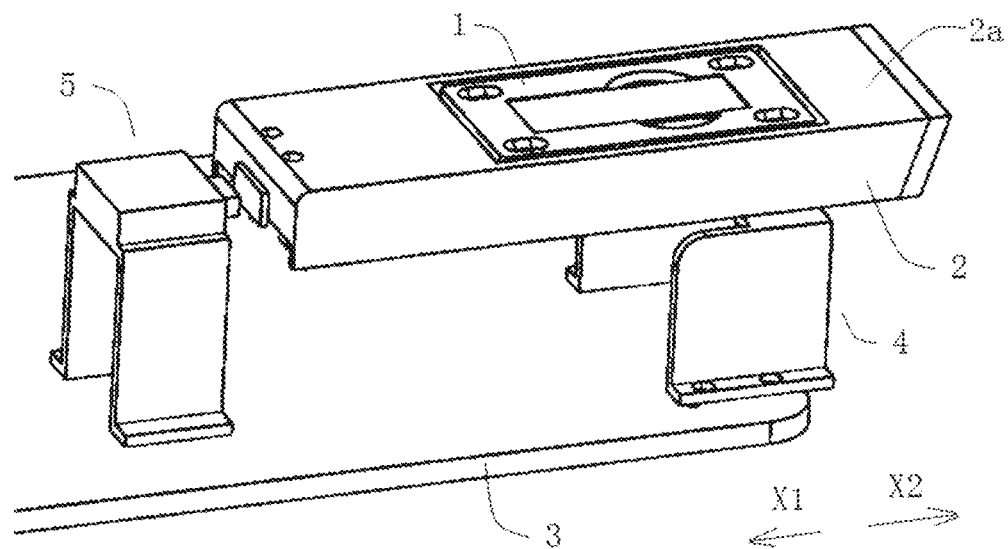
FIG. 2 is a structural diagram of a cabin entry-and-exit structure of an analysis device according to at least one embodiment of the present disclosure.

FIG. 1B is a structural diagram of a loading part according to at least one embodiment of the present disclosure. As shown in FIG. 1B, the loading part 1 is applied to an analysis device to bear the detection chip, such as the microfluidic chip shown in FIG. 1A. This loading part 1 is installed on the access part of an analysis device, and the access part adopts the cabin entry-and-exit structure according to at least one embodiment of this disclosure. FIG. 2 is a structural diagram of a cabin entry-and-exit structure of the analysis device according to at least one embodiment of the present disclosure. As shown in FIG. 2, the cabin entry-and-exit structure is configured to transport the loading part 1 to realize entry or exit of the loading part 1 into or out of a cabin. The cabin entry-and-exit structure includes a carrier body 2, a guide support component 4 and a door opening-and-closing assembly 5, the carrier body 2 being configured to bear the loading part 1. A receiving groove is disposed on an upper surface 2a of the carrier body 2 to receive the loading part 1; and a plurality of mounting holes (not shown) are disposed on a bottom surface of the receiving groove to be detachably connected to the loading part 1 by means of a fastener.

Specifically, as shown in FIG. 1B, the loading part 1 includes a loading plate 11 such as a rectangular plate, a chip groove 12 being disposed on a first plate surface 1a of the loading plate 11 to receive the detection chip. The chip groove 12 has a shape and size in match with a shape and size of the detection chip. In such way, the detection chip can be received while the position of the detection chip on the loading plate 11 can be limited, which ensures that the detection chip does not deviate from a detection position due to movement in the moving process. For example, an orthographic of the chip groove 12 on the loading plate 11 has a rectangular shape of the same size as the microfluidic chip shown in FIG. 1A. In addition, a pick-and-place groove 13 in communication with the chip groove 12 is further disposed on the first plate surface 1a. By means of the pick-and-place groove 13, the chip can be conveniently grabbed by human hands, thereby improving the convenience of picking and placing the chip. Optionally, an orthographic projection of the pick-and-place groove 13 on the loading plate 11 has a shape such as a semi-circle or a semi-ellipse. In addition, the pick-and-place groove 13 has the same depth as the chip groove 12 to facilitate processing.

In some embodiments of the present disclosure, optionally, two pick-and-place grooves 13 are symmetrically disposed at two opposite sides of the chip groove 12, such that the chip can be held by two fingers, and thus can be picked or placed more smoothly, preventing the chip from falling or colliding with the loading plate 11.

In some embodiments of the present disclosure, a plurality of mounting holes 15 are further disposed on the loading plate 11. When the loading plate 11 is placed in the receiving groove of the carrier body 2, each of the plurality of mounting holes 15 is coaxially disposed in one-to-one correspondence with the respective one of the mounting holes in the receiving groove, so as to fix the loading plate 11 on the carrier body 2 by screws. Optionally, a plurality of mounting holes 15 are distributed at four corners of the loading plate 11 to ensure that the loading plate 11 is uniformly stressed.

In some embodiments of the present disclosure, a receiving groove is disposed on an upper surface 2a of the carrier body 2 to receive the loading plate 11; and a plurality of mounting holes (not shown) are disposed on a bottom surface of the receiving groove to be detachably connected to the loading plate 11 by means of fasteners. Optionally, the receiving groove has a shape and size in match with a shape and size of the loading plate 11. In such way, the loading plate 11 can be received while the position of the loading plate 11 on the carrier body 2 can be limited, which ensures that the loading plate 11 does not move in the moving process. For example, the orthographic projection of the receiving groove on the carrier body 2 is a rectangular shape of the same size as the loading plate.

As shown in FIG. 2, the guide support assembly 4 is disposed on the base board 3 in the cabin body of the analysis device. FIG. 2 merely shows the base board 3. The guide support assembly 4 supports the carrier body 2, and the guide support assembly 4 is movably connected to the carrier body 2, so that the carrier body 2 is capable of moving along an entry direction or an exit direction. The entry direction is the direction X1 shown in FIG. 2; the exit direction is the direction X2 shown in FIG. 2.

A door opening-and-closing assembly 5 is disposed on the base board 3 and located on a side of the carrier body 2 far away from the cabin door (i.e., on the front side of the carrier body 2 in the direction X1), and is configured to apply a pushing force to the carrier body 2 towards the exit direction (i.e., the direction X2) when the carrier body 2 is subjected to a pressing force, so as to move the carrier body 2 to a cabin opening position, and to lock the carrier body 2 at a cabin closing position when the carrier body 2 is subjected to a pressing force again. It should be noted that the side of the carrier body 2 close to the cabin door is connected to the cabin door, or the side directly serves as the cabin door.

By repeatedly pressing the carrier body 2, entry and exit of the carrier body 2 into and out of a cabin can be realized, automatic cabin entry and exit can be realized, and the operation convenience and work efficiency can be improved.

In some embodiments of the present disclosure, optionally, as shown in FIGS. 3 and 4, the guide support assembly 4 includes a support component 41, a slider 42 and a guide rail 43. The support component 41 is disposed on the base board 3 and configured to support the carrier body 2. For example, the support component 41 adopts a bracket structure. Specifically, the bracket structure is composed of a horizontal support plate and two vertical support plates. The two vertical support plates are oppositely disposed in a direction perpendicular to the entry direction (i.e., the direction X1), and lower ends of the two vertical support plates are fixedly connected to the base board 3 through fasteners 44. The horizontal support plate is located between the two vertical support plates and is connected to the two vertical support plates into a whole. Such support component 41 can define the carrier body 2 at a position above the base board 3 by a certain height that is adapted to a height of the cabin opening for the entry and exit of the carrier body 2 on the cabin body of the analysis device. In other words, after the carrier body 2 is mounted to the support component 41 the height of the carrier body 2 distant from the base board 3 is determined by the reasonably designed height of the vertical support plates.

Figure 3A:
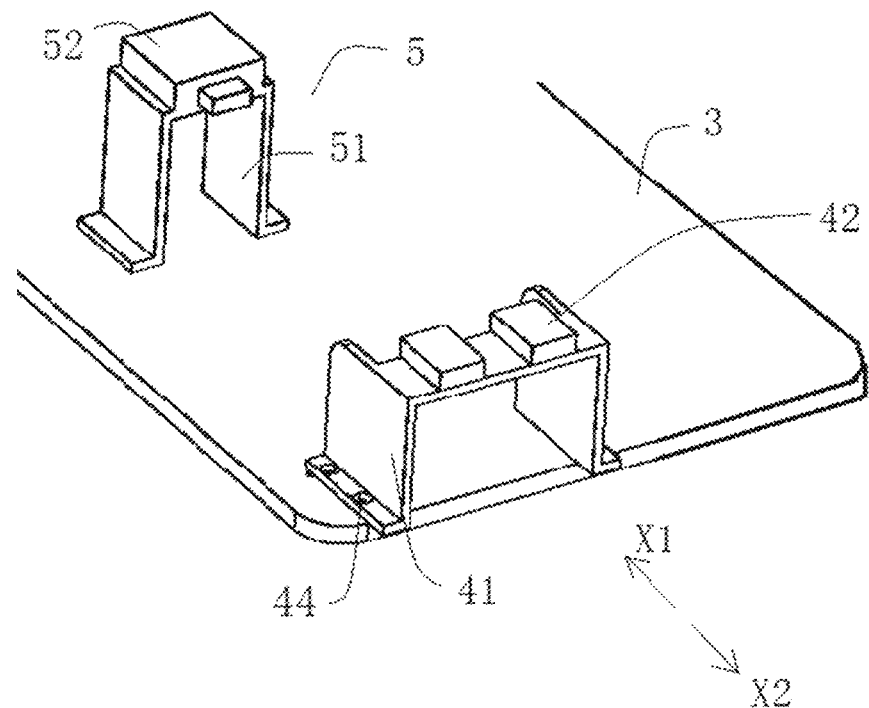
FIG. 3A is a structural diagram of a guide support assembly and a door opening-and-closing assembly according to at least one embodiment of the present disclosure.
Figure 3B:
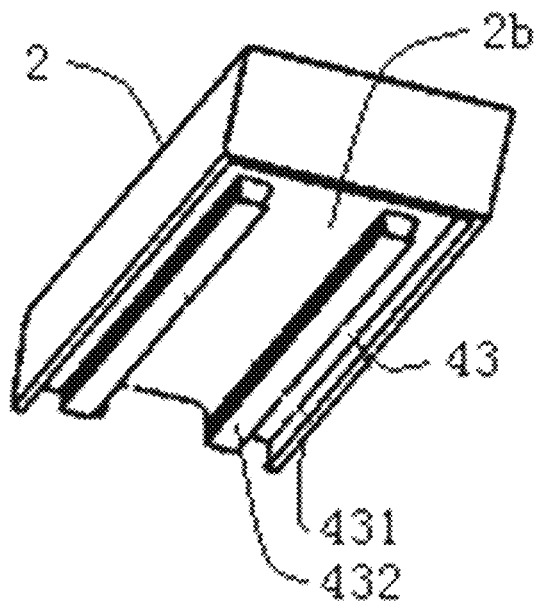
FIG. 3B is a bottom structural diagram of a carrier body according to at least one embodiment of the present disclosure.

In some embodiments of the present disclosure, as shown in FIG. 3A, the slider 42 is disposed on a surface of the support component 41 facing away from the base board 3 (i.e., an upper surface of the horizontal support plate). As shown in FIG. 3B, the guide rail 43 is disposed on a surface 2*b* of the carrier body 2 facing towards the base board 3, and is slidably connected to the slider 42 along an entry direction or an exit direction (i.e., direction X1 or direction X2). By means of the slider 42 and the guide rail 43, the movement direction of the carrier body 2 can be guided, thereby improving the movement stability and accuracy of the carrier body 2. The guide rail 43 can be of a variety of structures. For example, as shown in FIG. 4B, the guide rail 43 is a guide channel formed by a space between a side beam 431 and a guide bar 432 that are parallel to each other. The slider 42 is located in the guide channel and can slide along the guide channel. Optionally, two guide rails 43 are provided, and the two guide rails are spaced apart from each other in a direction perpendicular to the direction X1, so as to ensure stable support for the carrier body 2 while improving the movement stability of the carrier body 2. The sliders 42 have the same number as the guide rails 43, in one-to-one correspondence manner.

It should be noted that, in practical applications, the sliders 42 can also be disposed on the surface 2*b* of the carrier body 2 facing towards the base board 3, and the guide rails 43 can be disposed on the surface of the support component 41 facing away from the base board 3, in which case, a length of the support component 41 in the direction X1 can be increased appropriately.

Figure 4A:
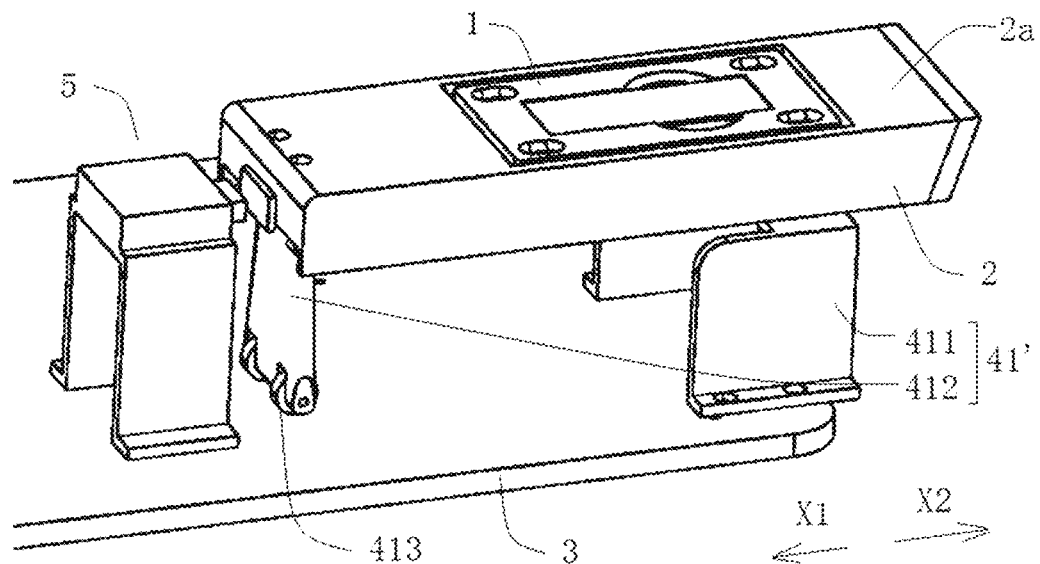
FIG. 4A is another structural diagram of a cabin entry-and-exit structure of an analysis device according to at least one embodiment of the present disclosure.
Figure 4B:
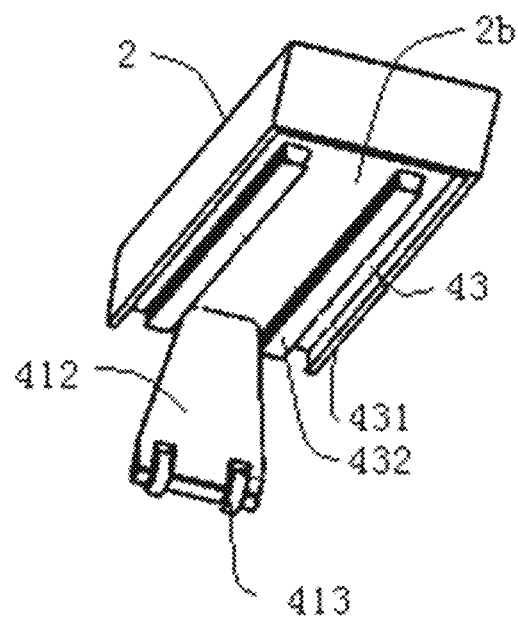
FIG. 4B is another bottom structural diagram of a carrier body according to at least one embodiment of the present disclosure.

In order to further improve the support stability and movement stability of the carrier body 2, optionally, as shown in FIGS. 4A and 4B, the guide support assembly 4 further includes another support component 41'. Specifically, the support component 41' includes a first support subcomponent 411, a second support subcomponent 412 and at least one roller 413. The first support subcomponent 411 is fixedly connected to the base board 3, and one of the guiding rail 43 and the slider 42 is disposed on a surface of the first support subcomponent 411 facing away from the base board 3. The structure and function of the first support subcomponent 411 are the same as those of the supporting structure in FIG. 3A, and are not described again here. As shown in FIG. 4B, the second support subcomponent 412 is fixedly connected to a surface 2*a* of the carrier body 2 facing towards the base board 3, and is close to one end of the carrier body 2 far away from the cabin door (i.e., a front end of the carrier body 2 in the direction X1). The roller 413 is disposed on the second support subcomponent 412 and is in rolling contact with the base board 3, that is, the roller 413 rolls on the surface of the base board 3. Optionally, a plurality of rollers 413 are provided and spaced apart in a direction perpendicular to the direction X1.

Since the first support subcomponent 411 and the second support subcomponent 412 are supported at different positions of the carrier body 2 in the direction X1, the movement stability of the carrier body 2 can be further improved.

Figure 5A:
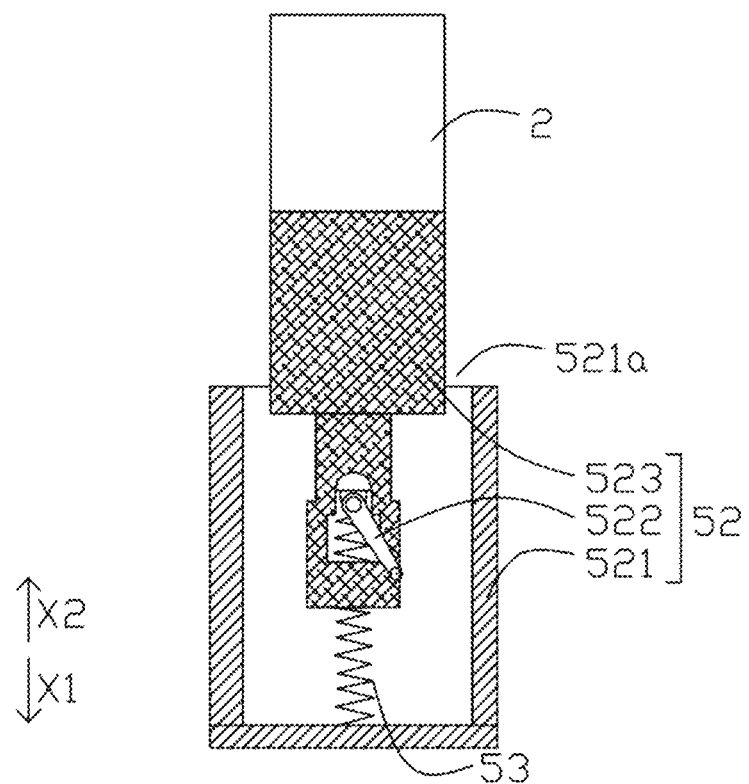
FIG. 5A is a cross-sectional view of a door opening-and-closing assembly according to at least one embodiment of the present disclosure.

Referring to FIG. 3A and FIG. 5A, the door opening-and-closing assembly 5 includes a fixing stand 51, a limiting structure 52 disposed on the fixing stand 51, and an elastic member 53 connected to the limiting structure 52. The fixing stand 51 is fixed on the base board 3 and is located at a side of the carrier body 2 close to an interior of the cabin body (i.e., at a front side of the carrier body 2 in the direction X1). The fixing stand 51 can have a structure similar to that of the supporting structure adopted by the support component 41 shown in FIG. 3A to fix the limiting structure 52 at a position above the base board 3 by a certain height, so that the limiting structure 52 is adapted to a height of the carrier body 2, i.e., after the limiting structure 52 is mounted to the fixing stand 51 the height of the limiting structure 52 from the base board 3 is determined by reasonably designed height of the fixing stand 51.

As shown in FIG. 5A, the limiting structure 52 is connected to the elastic member 53 and is detachably connected to the carrier body 2. The limiting structure 52 is configured to unlock the carrier body 2 when the carrier body 2 at the cabin closing position is moved to a trigger position along the entry direction (direction X1) under a pressing force, and to apply a pushing force to the carrier body towards the exit direction (direction X1) under an elastic force of the elastic member 53, so that the carrier body 2 moves to the cabin opening position. That is to say, before the carrier body is subjected to any pressing force, the carrier body 2 at the cabin closing position is limited at the cabin closing position under a limiting action by the limiting structure 52; when the carrier body 2 is subjected to a pressing force, the carrier body 2 moves from the cabin closing position to a trigger position along the entry direction (direction X1), and the limiting structure 52 unlocks the carrier body 2 to allow the carrier body 2 to exit the cabin; then, under an elastic force of the elastic member 53, the limiting structure 52 pushes the carrier body 2 to move along the exit direction (direction X2) until the carrier body 2 moves to the cabin opening position.

When the carrier body 2 at the cabin opening position is subjected to a pressing force and moves to the trigger position along the entry direction (direction X1), the limiting structure 52 locks the carrier body 2 at the cabin closing position.

The limiting structure 52 can have various structures. For example, as shown in FIG. 5A, the limiting structure 52 includes a housing 521, a limiting member 522 and a locking member 523. A side of the housing 521 opposite to the carrier body 2 (a side facing towards the exit direction (direction X2)) is provided with an opening 521*a*. The elastic member 53 is located in an internal space of the housing 521, a fixed end of the elastic member 53 is fixedly connected to the housing 521 (at a side opposite to the opening 521*a*), and a telescopic end of the elastic member 53 is fixedly connected to the locking member 523. The elastic member 53 can drive the locking member 522 to extend out of the opening 421*a* or retract into the internal space of the housing 521.

Figure 5B:
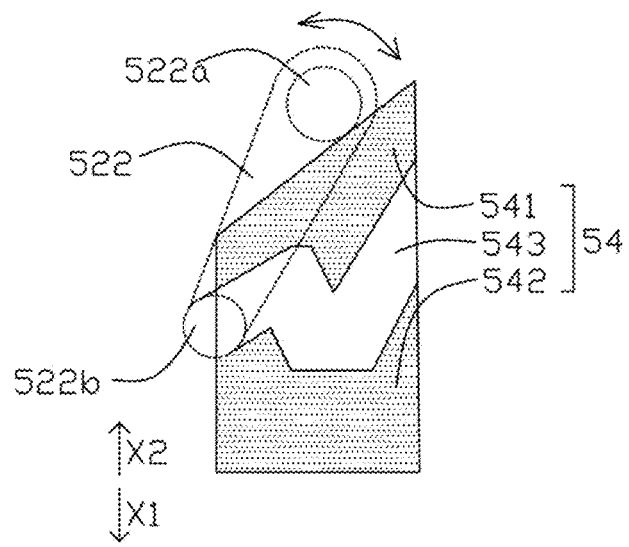
FIG. 5B is a structural diagram of a guide limiting part according to at least one embodiment of the present disclosure.

The limiting member 522 is rotatably connected to the telescopic end of the elastic member 53. As shown in FIG. 5B, a guide limiting portion 54 is disposed on an inner surface of the housing 521. The limiting member 522 is configured such that the telescopic end of the elastic member 53 drives the limiting member 522 into slide-fit with the guide limiting portion 54 when the telescopic end of the elastic member 53 is extended or retracted in a direction close to or far away from the opening 521*a* (i.e., the direction X2 or the direction X1).

The slide-fit between the limiting member 522 and the guide limiting portion 54 have various forms. For example, as shown in FIG. 5B, the guide limiting portion 54 includes a first fixing protrusion 541 and a second fixing protrusion 542 formed on an inner surface of the housing 521 facing towards an internal space in the housing 521 and spaced apart from each other in the direction X1, so as to form a limiting passage 543 therebetween. In addition, the limiting member 522 includes a rotating lever 522, and a first sliding protrusion 522*a* and a second sliding protrusion 522*b* disposed at two ends of the rotating lever 522. The first sliding protrusion 522*a* is movable along the first fixing protrusion

541 on an inclined surface shown in FIG. 5B, so as to drive the second sliding protrusion 522b to move into the limiting passage 543.

Figure 5C:
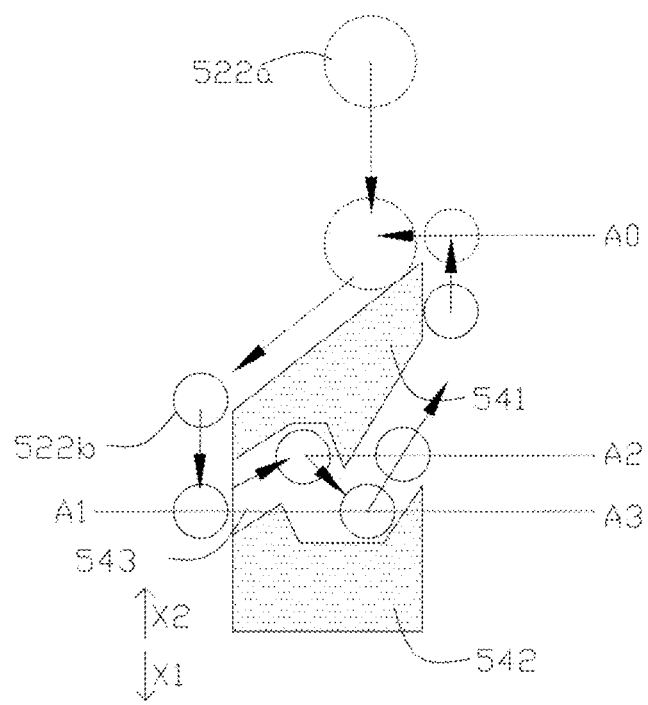
FIG. 5C is a diagram of a motion trail of a limiting member according to at least one embodiment of the present disclosure.
Figure 5D:
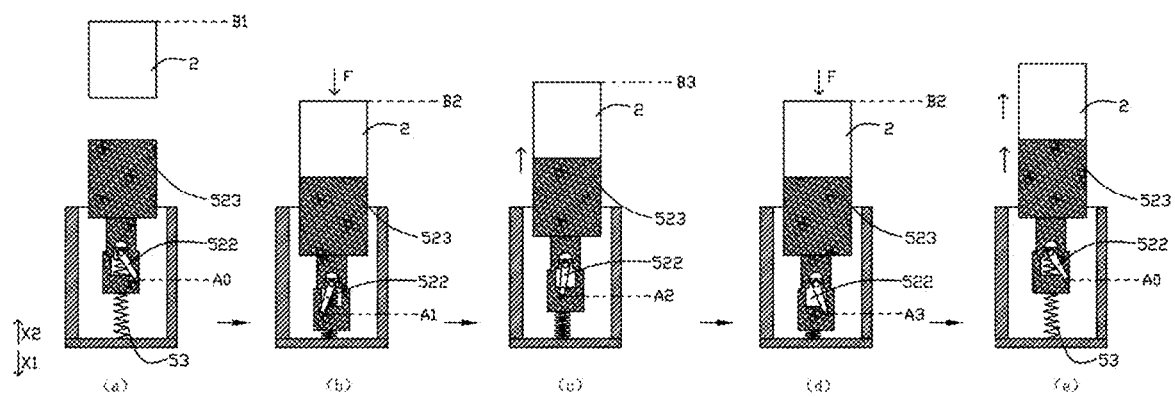
FIG. 5D is a diagram of a movement process of a door opening-and-closing assembly and a carrier body according to at least one embodiment of the present disclosure.

Specifically, FIG. 5D(a) illustrates the limiting member 522 at an initial position, and the carrier body 2 at a cabin opening position B1. When the carrier body 2 moves to a trigger position B2 along the entry direction (direction X1) by a pressing force F, as shown in FIG. 5D(b), the locking member 523 moves along the entry direction (direction X1) by the pushing force of the carrier body 2 to drive the telescopic end of the elastic member 53 to retract in the direction X1 and synchronously drive the rotating lever 522 to move in the direction X1. In this process, as shown in FIG. 5C, the first sliding protrusion 522a moves along the direction X1 and, when reaching the position A0, slides obliquely along an inclined surface of the first fixing protrusion 541 shown in FIG. 5C so that the rotating lever 522 drives the second sliding protrusion 522b to slide vertically along a vertical surface of the first fixing protrusion 541 shown in FIG. 5C and, until the second sliding protrusion 522b reaches the first position A1 corresponding to a first port of the limiting passage 543, enters the limiting passage 543 under a torque of the rotating lever 522.

When the pressing force F is released, as shown in FIG. 5D(c), the elastic member 53 in a compressed state will rebound along the direction X2 to drive the second sliding protrusion 522b to slide along the limiting passage 543 until a second position A2. At this time, as shown in FIG. 5C, the second sliding protrusion 522b fits with a recessed portion in the limiting passage 543 so that both are relatively fixed, thereby locking the carrier body 2 at the cabin closing position B3.

As shown in FIG. 5D(d), when the carrier body 2 is once again subjected to a pressing force F and moves to the trigger position B2 along the entry direction (direction X1), the locking member 523 moves along the entry direction (direction X1) under the pushing force of the carrier body 2 to drive the telescopic end of the elastic member 53 to retract along the direction X1 and synchronously drive the rotating lever 522 to move along the direction X1. As shown in FIG. 5C, the second sliding protrusion 522b moves along the entry direction (direction X1) from the second position A2 to be out of the recessed portion of the limiting passage 543, and continuously slides along the limiting passage 543 until being out of the limiting passage 543 (a portion of the limiting passage 543 is inclined to allow the second sliding protrusion 522Bb to move out), thereby unlocking the carrier body 2.

As shown in FIG. 5D(e), after the unlocking is finished, the telescopic end of the elastic member 53 extends in the direction X2 under the action of its own elastic force to drive the locking member 523 to move in the direction X2. In this process, the locking member 523 pushes the carrier body 2 to move in the direction X2 until reaching the exit position B1, that is, the process is circulated to the position shown in FIG. 5D (a).

It should be noted that the locking member 523 can move into or out of the internal space of the housing 521 through the opening 521a of the housing 521, and the locking member 523 is detachably connected to the carrier body 2 and is configured, as shown in FIG. 5D, to remain fixed to the carrier body 2 during the movement from the cabin opening position B1 to the cabin closing position B3, so as to lock the carrier body 2 at the cabin closing position B3. During the movement of the carrier body 2 from the cabin closing position B3 to the cabin opening position B1, the locking member 523 is separated from the carrier body 2, such that the carrier body 2 independently moves to the cabin closing position B3.

The locking member 523 can be detachably connected to the carrier body 2 in various manners. For example, the locking member 523 includes one of a magnet and an iron block, and the other of the magnet and iron block is disposed on a surface of the carrier body 2 opposite to the locking member 523. Thus, as shown in FIG. 5D, during the movement of the carrier body 2 from the cabin opening position B1 to the cabin closing position B3, the locking member 523 and the carrier body 2 are fixed by the magnet and the iron block through mutual attraction, so that the carrier body 2 is locked at the cabin closing position B3; and during the movement of the carrier body 2 from the cabin closing position B3 to the cabin opening position B1, the carrier body 2 can overcome the attraction force between the magnet and the iron block by the effect of self-inertia to be separated from the locking member 523, such that the carrier body 2 independently moves to the cabin closing position B3.

Figure 6A:
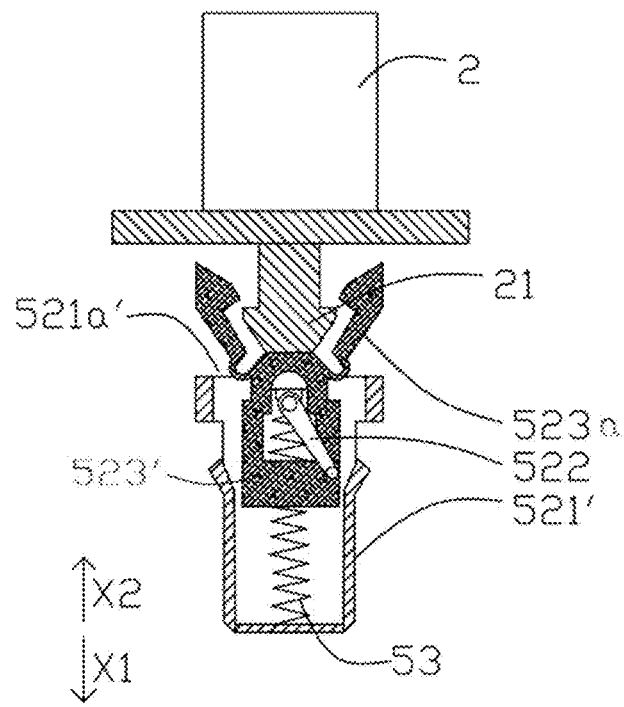
FIG. 6A is a cross-sectional view of another door opening-and-closing assembly in a state according to at least one embodiment of the present disclosure.
Figure 6B:
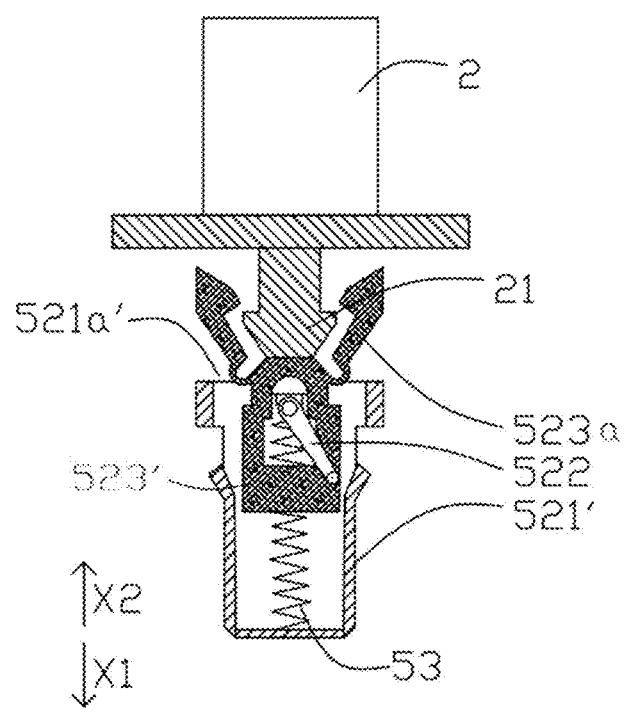
FIG. 6B is a cross-sectional view of another door opening-and-closing assembly in another state according to at least one embodiment of the present disclosure.

As another example, the manner in which the locking member 523 is detachably connected to the carrier body 2 can also adopt a structure as shown in FIG. 6A and FIG. 6B. Specifically, a first catch 21 is disposed on a surface of the carrier body 2 opposite to the locking member 523', and the locking member 523' includes a second catch 523a which, as shown in FIG. 6A, is in an original state of being separated from the first catch 21, when located outside the internal space of the housing 521'. As shown in FIG. 6B, during the movement of the second catch 523a into the internal space of the housing 521' through an opening of the housing 521', the second catch 523a is elastically deformed by the extrusion force of the housing 521' to be engaged with the first catch 21. Thus, as shown in FIG. 5D, during the movement of the carrier body 2 from the cabin opening position B1 to the cabin closing position B3, the locking member 523' is pushed to move along the direction X1, and the second catch 523a is synchronously driven to move into the internal space of the housing 521' through the opening of the housing 521', thus to be engaged with the first catch 21 and lock the carrier body 2 at the cabin closing position B3. During the movement of the carrier body 2 from the cabin closing position B3 to the cabin opening position B1, the carrier body 2 drives the locking member 523' to move along the direction X2, and synchronously drives the second catch 523a to move out of the internal space of the housing 521' through the opening of the housing 521', so that the second catch 523a is reset to the original state of being separated from the first catch 21, thereby realizing separation of the locking member 523' from the carrier body 2. As such the carrier body 2 can independently move to the cabin closing position B3 under the effect of self-inertia. Note that the structure shown in FIGS. 6A and 6B employs the same slide-fit manner as the limiting member 522 in FIG. 5A and the guide limiting portion 54 in FIG. 5B.

In some embodiments of the present disclosure, optionally, the surface of the carrier body 2 facing away from an interior of the cabin body (i.e. a front surface in the direction X2) is flush with an outer surface of the cabin body when the carrier body 2 is at the cabin closing position, i.e. the surface of the carrier body 2 facing away from the interior of the cabin body serves as the cabin door.

Figure 7:
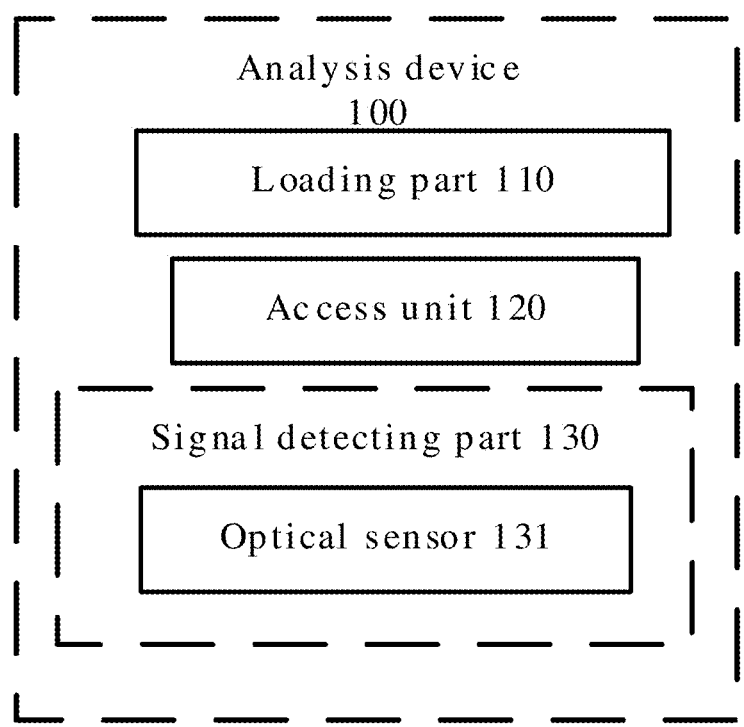
FIG. 7 is a block diagram showing a principle of an analysis device according to at least one embodiment of the present disclosure.

At least one embodiment of the present disclosure further provides an analysis device. FIG. 7 is a schematic structural diagram of the analysis device according to at least one embodiment of the present disclosure. As shown in FIG. 7, an analysis device 100 according to at least one example of the present disclosure includes at least a loading part 110, an access part 120, and a signal detecting part 130.

The loading part 110 is configured to bear a detection chip. The structure of the loading part 110 adopts, for example, the structure shown in FIG. 1B. In practical applications, detection chips of different types and sizes can be equipped with different loading parts 110.

The access part 120 adopts the cabin entry-and-exit structure according to at least one embodiment of the present disclosure, and is configured to transport the loading part 110 to realize entry or exit of the loading part 110 into or out of a cabin.

The signal detecting part 130 includes an optical sensor 131. The optical sensor 131 is configured to receive light from the detection chip and, when the access part 120 is located at the cabin closing position, to perform detection based on the light of the detection chip.

In some embodiments of the present disclosure, optionally, as shown in FIG. 1B, an optical detection centering region 14 is disposed on a bottom surface of the chip groove 12. The optical detection centering region 14 is directly opposite to the signal detecting part 130 and is located at a center of an image, i.e., at an image capture focus. In such way, when the detection chip is mounted, it is possible to observe whether the type and size of the detection chip match with the current loading part 110, and whether the placement direction of the detection chip in the chip groove 12 is correct. The optical detection centering region 14 is, for example, a depression formed on the bottom surface of the chip groove 12, or can be other identifiable markings. It should be noted that the detection chip is generally transparent, so that the optical detection centering region 14 can be observed through the detection chip.

The optical sensor 131 is, for example, an image sensor configured to capture an image of the detection chip (e.g., a biochip image) for analysis. For example, the optical sensor 131 includes a Charge Coupled Device (CCD) or a Complementary Metal Oxide Semiconductor (CMOS). However, it should be understood that in other embodiments, the optical sensor 131 can also be a photodiode, a photoresistor, an infrared sensor, an ultraviolet sensor, etc., which is not limited in the embodiment of the present disclosure.

It should be noted that, for the Charge Coupled Device (CCD), since it can take an image at one time without splicing, mechanical movement parts can be reduced, and further the size of the whole device can be reduced, which brings forth portability. In addition, optionally, after an original image shot by the CCD is subjected to denoising processing and contrast enhancement, Hough Transform method can be used to identify a circular area in the fluorescence signal to be detected in the image and calculate a circle center coordinate, and then divide the fluorescence area based on the circle center coordinate; and calculate the gray value of each area on the original image, and compare the calculated gray value of each area with a gray value of a standard concentration image to obtain the concentration of the sample to be detected.

Figure 8:
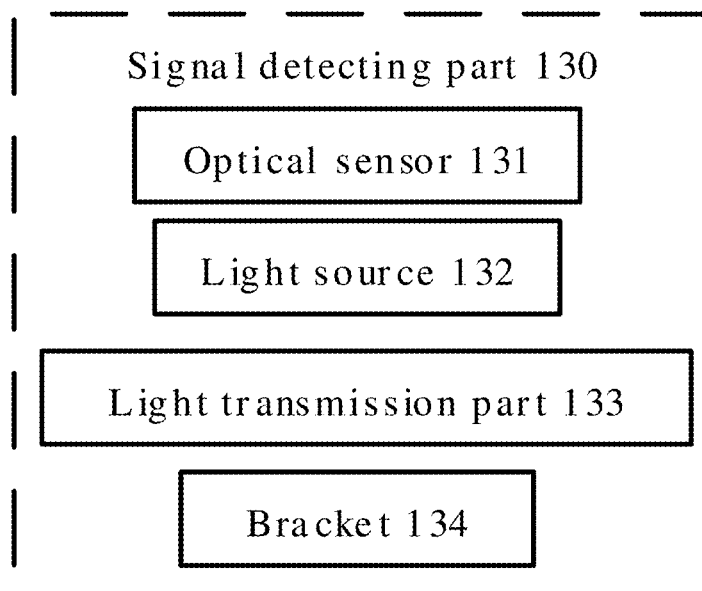
FIG. 8 is a block diagram showing a principle of a signal detecting part according to at least one embodiment of the present disclosure.

FIG. 8 is a schematic structural diagram of a signal detecting part according to at least one embodiment of the present disclosure. As shown in FIG. 8, in at least one embodiment of the present disclosure, the signal detecting part 130 further includes a light source 132, a light transmission part 133, and a bracket 134, in addition to the optical sensor 131.

The light source 132 is configured to provide, in use, light to illuminate the detection chip. The light transmission part 133 is configured to transmit, in use, light provided by the light source 132 to the detection chip and light emitted by the detection chip to the optical sensor 131.

For example, the light source 132 can be of various types that can emit visible light, infrared light, etc. For example, the light source 132 includes a laser or a fluorescent light source, and wavelengths of the laser and the fluorescent light source are selected according to actual needs, which is not limited in the embodiment of the present disclosure.

Figure 9:
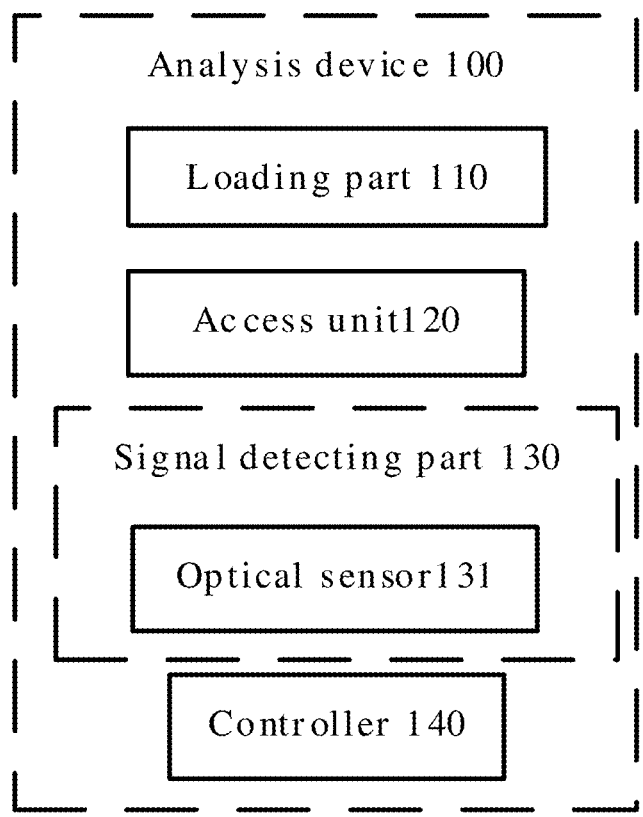
FIG. 9 is another block diagram showing a principle of the analysis device according to at least one embodiment of the present disclosure.
Figure 10A:
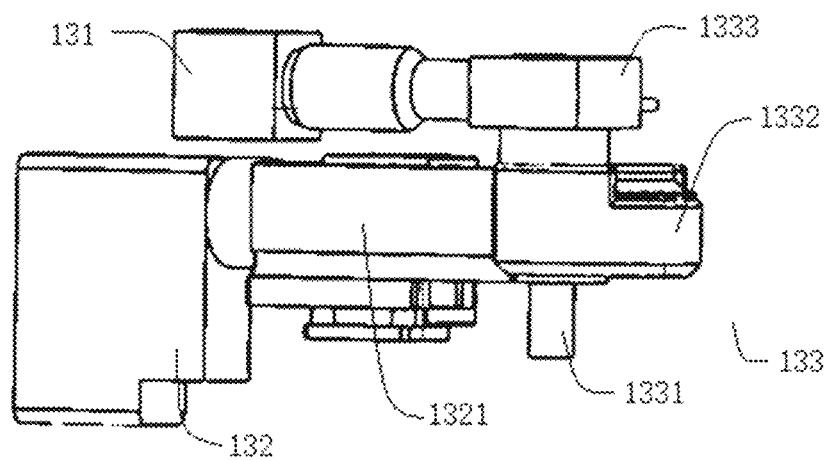
FIG. 10A is a side view of a signal detecting part according to at least one embodiment of the present disclosure.
Figure 10B:
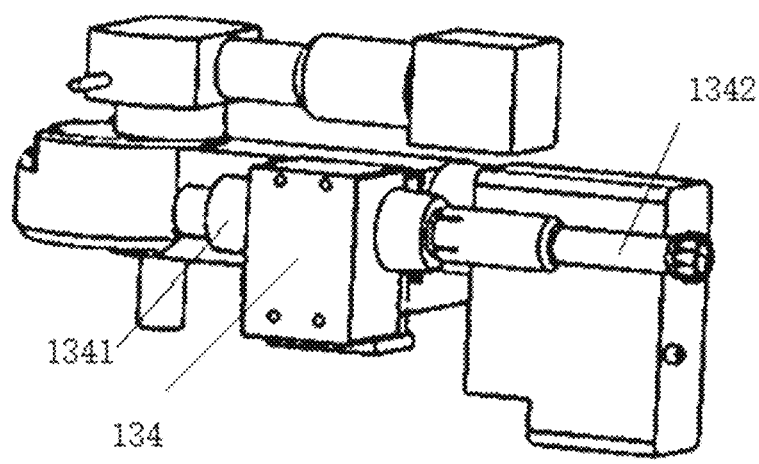
FIG. 10B is another side view of the signal detecting part according to at least one embodiment of the present disclosure.

FIG. 10A is a side view of a signal detecting part according to at least one embodiment of the present disclosure. FIG. 10B is another side view of a signal detecting part according to at least one embodiment of the present disclosure. As shown in FIGS. 9A and 9B, in some embodiments of the present disclosure, the light transmission part 133 includes a ninety-degree turning prism system 1333 and a reflective optical path system 1332. The ninety-degree turning prism system 1333 is configured to transmit light from the detection chip to the optical sensor 131. The reflective optical path system 1332 is configured to transmit light from light source 132 to illuminate the detection chip, and the reflective optical path system 1332 further includes a filter on the optical path from the detection chip to optical sensor 131, to filter light transmitted on the optical path and allow only light of a set wavelength to pass through. Both the ninety-degree turning prism system 1333 and the reflective optical path system 1332 can be of conventional design in the art, and will not be described in detail herein. Further, optionally, the light source 132 emits light through a lighting module 1321, and the lighting module 1321 is adapted to distribute light uniformly.

As shown in FIGS. 10A and 10B, in some embodiments, the signal detecting part 130 further includes an objective lens 1331 configured to collect light from the detection chip. For example, the objective lens 1331 includes a lens.

As shown in FIGS. 10A and 10B, the bracket 134 is configured to fix and support at least some of the components of the signal detecting part 130, such as the light source 132, the light transmission part 133, and the like. In some embodiments, a focus adjustment structure is further disposed on the bracket 134, and the focus adjustment structure is configured to adjust a distance between the light transmission part 133 and the detection chip, so that the detection chip is at a focus of the light transmission part 133. As shown in FIG. 10B, the focus adjustment structure includes a focus adjustment knob 1341 and a knob extension 1342 connected to the focus adjustment knob 1341, the knob extension 1342 extending to a side close to the light transmission part 133 to facilitate manual adjustment. The bracket 134 can be of conventional design in the art and will not be described in detail in the present disclosure.

In some embodiments of the present disclosure, as shown in FIG. 9, the analysis device 100 further includes a controller 140 configured to be in signal connection with the optical sensor 131 to analyze light from a detection chip. The one or a plurality of controllers are configured to perform at least one of the following operations of:

making a signal connection with the access part 120 to control the access part 120 to enter and exit a cabin; and
making a signal connection with the optical sensor 131 to analyze light from a detection chip.

The controller can be implemented, for example, by a Central Processing Unit (CPU), a Digital Signal Processor (DSP), a single chip microcomputer, a Field Programmable Gate Array (FPGA), a Complex Programmable Logic Device (CPLD), an Application Specific Integrated Circuit (ASIC), and the like, which is not limited in the embodiment of the present disclosure.

It should be understood that in some embodiments of the present disclosure, the controller can be implemented as a plurality of sub-controllers that can each perform at least one of the operations described above. The plurality of sub-controllers can be separately disposed or integrated in one controller, which is not limited in the embodiment of the present disclosure.

In some embodiments of the present disclosure, the analysis device 100 can further include a communication unit. The communication unit is configured to form a signal connection with a mobile terminal, a server, or the like. The signal connection can be a wired connection or a wireless connection, which is not limited in the embodiment of the present disclosure. Exemplary Wireless connections include Wireless fidelity (Wi-Fi), Bluetooth, Wireless Direct (Wireless Direct), and infrared. Exemplary wired connections include Universal Serial Bus (USB), FireWire (FireWire), Thunderbolt (Thunderbolt), or any connection that requires a physical cable.

Figure 11:
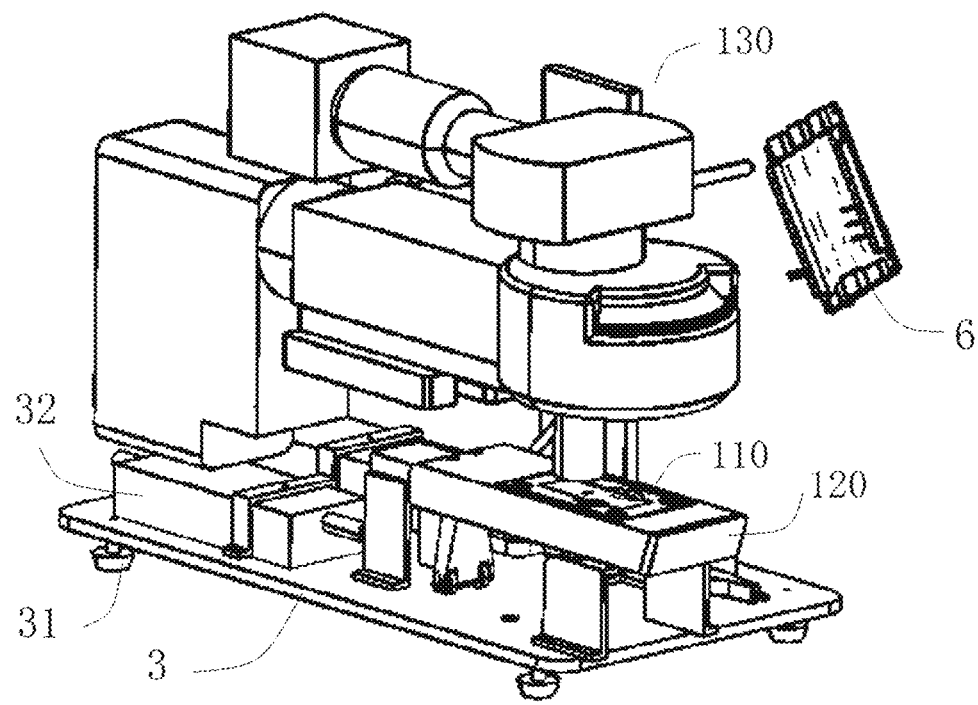
FIG. 11 is an internal assembly diagram of the analysis device according to at least one embodiment of the present disclosure.

FIG. 11 is an internal assembly diagram of an analysis device according to at least one embodiment of the present disclosure. As shown in FIG. 11, the loading part 110, the access part 120, and the signal detection part 130 are all integrated on the base board 3, and the base board 3a is further integrated with a power adapter 32. Optionally, four feet 31 are disposed at the bottom of the base board 3, lower ends of the four feet 31 are located outside the cabin body of the analysis device, and upper ends of the four feet 31 extend into the cabin body and are fixedly connected to the bottom of the base board 3. In addition, a development board 6, which is integrated with the control part 140, is mounted on an inner surface of the cabin body (not shown in the drawings).

Figure 12A:
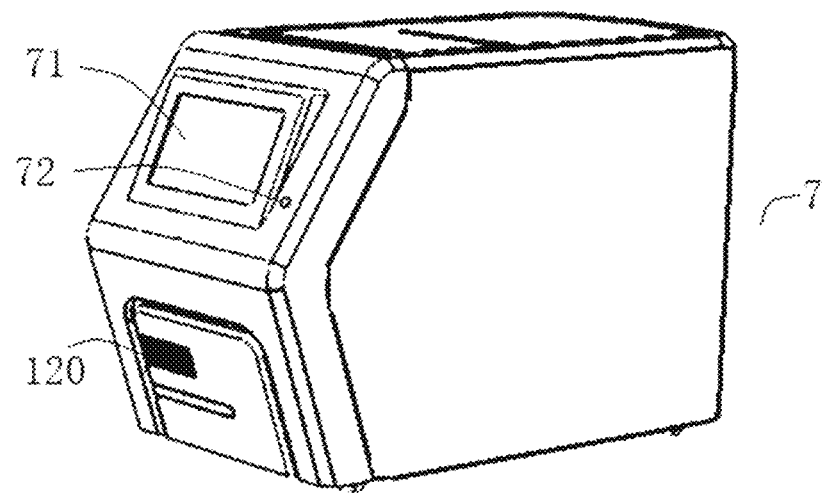
FIG. 12A is an external assembly diagram of the analysis device according to at least one embodiment of the present disclosure.
Figure 12B:
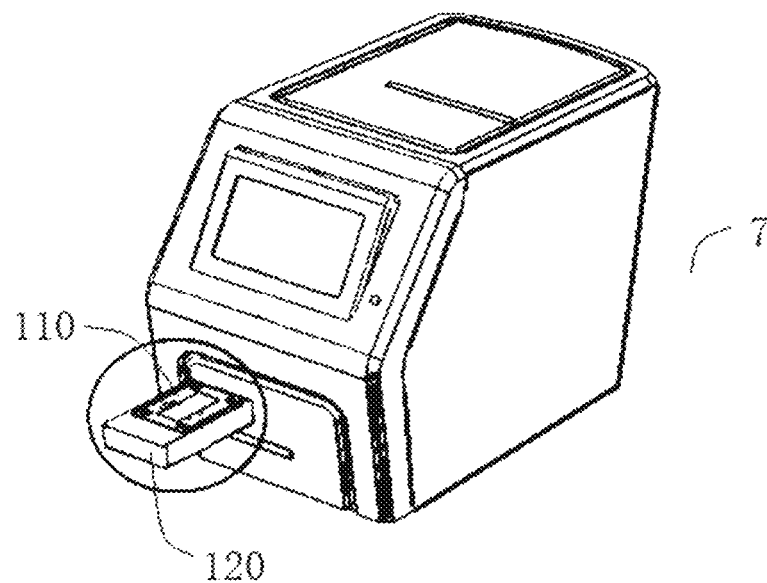
FIG. 12B is another external assembly diagram of the analysis device according to at least one embodiment of the present disclosure.

FIGS. 12A and 12B are two general assembly views of the carrier body 7 of the analysis device according to at least one embodiment of the present disclosure. As shown in FIG. 12A, an analysis device according to at least one embodiment of the present disclosure further includes a display screen 71. The display screen 71 is, for example, disposed on a front surface of the cabin body 7, which is configured to display, and which is, for example, a liquid crystal display, an Organic Light Emitting Diode (OLED) display, a quantum dot light emitting diode (QLED) display, a micro light emitting diode display, an electronic ink display, an electronic paper display, and the like, which is not limited in the embodiment of the present disclosure. For example, the display screen 71 is a touch display to receive input from a user. However, it should be understood that, in some embodiments, the analysis device can not include the display screen 71 but be connected to a display screen that is separately disposed, or can output data such as analysis results in the form of a digital file or a physical file, which is not limited in the embodiment of the present disclosure.

Optionally, the front surface of the cabin body 7 is further provided with a cabin opening allowing the access part 120 to protrude therefrom to load the detection chip on the loading part 110.

Optionally, a switch 72 is further disposed on the front surface of the cabin body 7 to turn on or off the development board 6.

Optionally, the analysis device further includes a data transmission interface. The data transmission interface is configured to output data of an analysis device, such as an analysis result, to an external apparatus or to transmit data from the external apparatus into the analysis device. The data transmission interface can be, for example, a Universal Serial Bus (USB) interface, a Serial Advanced Technology Attachment (SATA) interface, or the like. In at least one embodiment, the data transmission interface and the power interface can be combined into one interface, such as a USB interface, to transmit both data and power. An analysis device according to at least one embodiment of the present disclosure further includes a key. The key is configured to obtain an input instruction of a user, and can be, for example, a mechanical key, an optical key, and the like, which is not limited in the embodiment of the present disclosure.

In practical applications, the analysis device 100 includes at least one of a group consisting of a display screen, a touch sensor and a power interface, which is not limited in the embodiment of the present disclosure.

Figure 13:
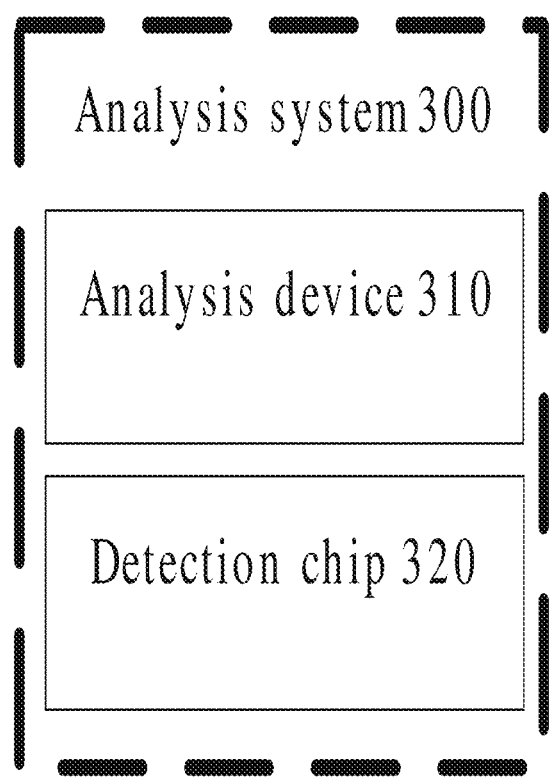
FIG. 13 is a block diagram showing a principle of an analysis system according to at least one embodiment of the present disclosure.

At least one embodiment of the present disclosure also provides an analysis system. FIG. 13 is a principle block diagram of an analysis system according to at least one embodiment of the present disclosure. As shown in FIG. 13, the analysis system 300 includes an analysis device 310 and a detection chip 320, for example, the analysis device 310 and the detection chip 320 that is not used can be provided in combination to a user for use. The analysis device 310 can be any of the analysis devices described above. The detection chip 320 can be any of the detection chips described above.

It should be noted that:
(1) The drawings of the embodiments of the disclosure only relate to the structures related to the embodiments of the disclosure, and other structures can refer to common designs.
(2) Without conflict, embodiments of the present disclosure and features of the embodiments can be combined with each other to arrive at new embodiments.

The above description is only a specific embodiment of the present disclosure, but the scope of the present disclosure is not limited thereto, and the scope of the present disclosure is defined by the appended claims.

What is claimed is:
1. A cabin entry-and-exit structure of an analysis device, configured to transport a loading part for bearing a detection chip in the analysis device, for entry or exit of the loading part into or out of a cabin,
the cabin entry-and-exit structure comprising:
a carrier body configured to receive the loading part;
a guide support assembly disposed on a base board in a cabin body of the analysis device and is configured to bear the carrier body, and the guide support assembly is movably connected to the carrier body such that the carrier body is movable along an entry direction into the cabin or an exit direction out of the cabin; and
a door opening-and-closing assembly disposed on the base board and located on a side of the carrier body far away from a cabin door, wherein the door opening-and-closing assembly is configured to apply a pushing force to the carrier body towards the exit direction when the carrier body is subjected to a pressing force such that the carrier body moves to a cabin opening position, and to lock the carrier body at a cabin closing position when the carrier body is subjected to a pressing force again;
wherein the guide support assembly further comprises;
a support component disposed on the base board and configured to support the carrier body, wherein the support component comprises;

a first support subcomponent, wherein the first support subcomponent is fixedly connected to the base board, and one of the guide rail and the slider is disposed on a surface of the first support subcomponent facing away from the base board;

a second support subcomponent, wherein the second support subcomponent is fixedly connected to a surface of the carrier body facing towards the base board, located proximal to one end of the carrier body and distal from the cabin door;

at least one roller, a guide rail; and a slider, wherein the one of the guide rail and the slider is disposed on a surface of the support component facing away from the base board, and the other of the guide rail and the slider is disposed on a surface of the carrier body facing towards the base board; and the guide rail and the slider are slidably connected along the entry direction or the exit direction; and the at least one roller is disposed on the second support subcomponent and is in rolling contact with the base board; and wherein the door opening-and-closing assembly further comprises;

a fixing stand, a limiting structure disposed on the fixing stand, and an elastic member connected to the limiting structure, wherein the fixing stand is fixed on the base board and located at a side of the carrier body distal from the cabin door;

wherein the limiting structure is connected to the elastic member and is detachably connected to the carrier body, and the limiting structure is further configured to unlock the carrier body when the carrier body at the cabin closing position moves to a trigger position along the entry direction under the pressing force, and to apply a pushing force to the carrier body towards the exit direction under an elastic force of the elastic member, so that the carrier body moves to the cabin opening position; and wherein the limiting structure locks the carrier body at the cabin closing position when the carrier body at the cabin opening position moves to the trigger position along the entry direction under the pressing force; and wherein the limiting structure further comprises;

a housing, a limiting member, and a locking member, wherein the housing has an opening at a side opposite to the carrier body, and a guide limiting part is disposed at an inner surface of the housing;

wherein the elastic member is positioned in an internal space of the housing, a fixed end of the elastic member is fixedly connected to the housing, and a telescopic end of the elastic member is fixedly connected to the locking member:

wherein the limiting member is rotatably connected to the telescopic end of the elastic member, and the limiting member is configured such that when the telescopic end of the elastic member is stretched and retracted in a direction close to or far away from the opening, the elastic member is configured to drive the limiting member to slide along the guide limiting part, so that the limiting member sequentially passes through a first position, a second position and a third position from an initial position, wherein when the limiting member is at the initial position, the carrier body is positioned at the cabin opening position and when the limiting member is at the first position or the third position, the carrier body is positioned at the trigger position; when the limiting member is at the second position, the limiting member and the guide limiting part are relatively fixed, and the carrier body is positioned at the cabin closing position; and the locking member is configured to move into and out of the internal space of the housing through the opening, and the locking member is detachably connected to the carrier body and is configured to remain connected to the carrier body in a process where the carrier body moves from the cabin opening position to the cabin closing position, such that the carrier body is locked at the cabin closing position; and the locking member is separated from the carrier body in a process where the carrier body moves from the cabin closing position to the cabin opening position, so that the carrier body independently moves to the cabin opening position.

2. The cabin entry-and-exit structure of claim 1, wherein the locking member comprises one of a magnet and an iron block, and the other of the magnet and the iron block is disposed on a surface of the carrier body opposite to the locking member.

3. The cabin entry-and-exit structure of claim 1, wherein a first catch is disposed on a surface of the carrier body opposite to the locking member, the locking member comprises a second catch, which is in an original state of being separated from the first catch when located outside the internal space of the housing; and wherein the second catch generates elastic deformation under an extrusion action of the housing in a process of moving into the internal space of the housing through the opening, so as to be engaged with the first catch.

4. The cabin entry-and-exit structure of claim 1, wherein a receiving groove is disposed on an upper surface of the carrier body to receive the loading part; and a plurality of mounting holes are disposed on a bottom surface of the receiving groove to be detachably connected to the loading part by a fastener.

5. The cabin entry-and-exit structure of claim 1, wherein a surface of the carrier body facing away from an interior of the cabin body is flush with an outer surface of the cabin body when the carrier body is located at the cabin closing position.

6. An analysis device, comprising:

a loading part, an access part and a signal detecting part, wherein the loading part is configured to receive a detection chip;

the access part includes the cabin entry-and-exit structure of claim 1 and the signal detecting part includes an optical sensor, wherein the optical sensor is configured to receive light from the detection chip and perform detection based on the light when the access part is located at the cabin closing position.

7. The analysis device of claim 6, wherein
the loading part comprises a loading plate, and a chip groove is disposed on a first plate surface of the loading plate to receive the detection chip;
the chip groove has a shape and size in match with a shape and size of the detection chip; and
a pick-and-place groove in communication with the chip groove is further disposed on the first plate surface.

8. The analysis device of claim 7, wherein two pick-and-place grooves are symmetrically disposed at opposite sides of the chip groove.

9. The analysis device of claim 7, wherein an optical detection centering region is disposed on a bottom surface of the chip groove, the optical detection centering region being directly opposite to the signal detecting part and located at a center of an image.

10. The analysis device of claim 6, wherein the optical sensor is an image sensor configured to capture an optical image of the detection chip for analysis.

11. The analysis device of claim 10, wherein the image sensor is a charge coupled device.

12. The analysis device of claim 6, wherein the signal detecting part further comprises:
a light source configured to provide light to illuminate the detection chip;
a light transmission part configured to transmit the light from the light source to the detection chip and to transmit light emitted by the detection chip to the optical sensor; and
a bracket configured to fix and support the light source and the light transmission part, and a focal length adjusting structure is further disposed on the bracket and configured to adjust a distance between the light transmission part and the detection chip, such that the detection chip is located at a focus of the light transmission part; and the focal length adjusting structure has a focal length adjusting knob and a knob extension connected to the focal length adjusting knob, the knob extension extending to a side close to the optical transmission portion.

13. The analysis device of claim 6, further comprising a controller configured to be in signal connection with the optical sensor to analyze the light from the detection chip.

14. The analysis device of claim 6, wherein the analysis device further comprises at least one of groups consisting of a display screen, a touch sensor, a power interface, and a data transmission interface.

15. The analysis device of claim 6, wherein the analysis device is applied to a microfluidic chip.

* * * * *